United States Patent
Zhan (10) Patent No.: US 11,063,465 B2
(45) Date of Patent: Jul. 13, 2021

(54) SWITCHING MODE FRONT END SURGE PROTECTION CIRCUIT

(71) Applicant: NovAtel Inc., Calgary (CA)

(72) Inventor: Jack Zhan, Calgary (CA)

(73) Assignee: NovAtel Inc., Calgary (CA)

( * ) Notice: Subject to any disclaimer, the term of this patent is extended or adjusted under 35 U.S.C. 154(b) by 352 days.

(21) Appl. No.: 15/883,184

(22) Filed: Jan. 30, 2018

(65) Prior Publication Data

US 2019/0237989 A1    Aug. 1, 2019

(51) Int. Cl.
*H02J 7/14* (2006.01)
*H02H 7/18* (2006.01)
*H02H 3/22* (2006.01)
*G05F 1/56* (2006.01)
*H02H 3/20* (2006.01)
*H02H 9/04* (2006.01)

(52) U.S. Cl.
CPC .............. *H02J 7/1461* (2013.01); *G05F 1/56* (2013.01); *H02H 3/20* (2013.01); *H02H 3/22* (2013.01); *H02H 7/18* (2013.01); *H02H 9/04* (2013.01)

(58) Field of Classification Search
CPC ... G05F 1/56; H02H 3/20; H02H 3/22; H02H 7/18; H02H 9/04; H02J 7/1461
USPC ........................................................ 307/10.7
See application file for complete search history.

(56) References Cited

U.S. PATENT DOCUMENTS

| | | | | |
|---|---|---|---|---|
| 3,959,708 A * | 5/1976 | Allport | ................. | H02J 7/1461 322/99 |
| 4,223,363 A * | 9/1980 | Santis | ....................... | H02J 7/24 361/18 |
| 5,396,165 A * | 3/1995 | Hwang | ...................... | G05F 1/70 323/210 |
| 5,436,786 A | 7/1995 | Pelly et al. | | |
| 6,548,916 B1* | 4/2003 | Kanazawa | ........... | H03K 17/063 307/10.1 |
| 2002/0097024 A1* | 7/2002 | Fury | ....................... | H02P 9/305 322/28 |
| 2003/0223169 A1 | 12/2003 | Ely | | |
| 2004/0051145 A1* | 3/2004 | Nobe | ................. | H03K 17/0822 257/355 |
| 2008/0013760 A1* | 1/2008 | Mitsuda | ............... | H03K 17/162 381/123 |

(Continued)

FOREIGN PATENT DOCUMENTS

WO    2016/124480    8/2016

OTHER PUBLICATIONS

European Search Report for corresponding EP Application No. 19152156.6 dated Jul. 1, 2019, 9 pages.

*Primary Examiner* — Rexford N Barnie
*Assistant Examiner* — Brian K Baxter
(74) *Attorney, Agent, or Firm* — Cesari and McKenna, LLP (57) ABSTRACT

A switching mode front end surge protection circuit protects downstream devices from a load dump. Specifically, the switching mode front end surge protection circuit includes a metal-oxide-semiconductor field-effect transistor (MOSFET) that operates in either one of two modes based on an input voltage provided by an alternator. When the input voltage is less than a voltage threshold value, the MOSFET operates in a pass-through mode. When the input voltage is greater than the voltage threshold value, the MOSFET operates in a switching mode to oscillate between an on state and an off state.

20 Claims, 5 Drawing Sheets (56) References Cited

U.S. PATENT DOCUMENTS

| | | |
|---|---|---|
| 2010/0026253 A1 | 2/2010 | Wang |
| 2013/0063087 A1* | 3/2013 | Martaeng ............ H02J 2207/20 320/109 |
| 2013/0119378 A1* | 5/2013 | Yamazaki ........... H01L 29/7869 257/43 |
| 2013/0265810 A1* | 10/2013 | Kawato ................. H02M 3/335 363/131 |
| 2014/0009134 A1* | 1/2014 | Bernardon ............ H02J 7/0029 323/284 |
| 2014/0055894 A1* | 2/2014 | Maruyama ............... H02H 9/04 361/56 |
| 2014/0111113 A1 | 4/2014 | Del Carmen, Jr. |
| 2016/0226238 A1* | 8/2016 | Matsushita ............... H02J 1/00 |
| 2016/0254662 A1 | 9/2016 | Dawley |
| 2016/0294180 A1 | 10/2016 | Pagano et al. |

* cited by examiner

SWITCHING MODE FRONT END SURGE PROTECTION CIRCUIT

BACKGROUND

Technical Field

The invention relates generally to a surge protection circuit, and in particular, a switching mode front end surge protection circuit to protect devices from a load dump.

Background Information

A load dump occurs when the load to which a generator is delivering current is abruptly disconnected. In automotive electronics, an automotive load dump is a surge in voltage that is caused by a condition that occurs, e.g., disconnection of battery, battery failure, blown power fuse, etc., while the battery is being charged by an alternator. Based on the condition occurring while the battery is being charged, the current from the alternator causes the voltage on the vehicle power bus to increase significantly for a period of time (e.g., approximately 0.5 seconds). The peak voltage of this surge may be as high as 120V for a 12V system and 240V for a 24V system, and the surge may take up to 400 ms to decay. The voltage spike may cause damage to the downstream devices, e.g., Electronic Control Units (ECUs), sensors, entertainment systems, which are connected to the alternator via the vehicle power bus.

To protect the downstream devices from the voltage spike, existing systems may utilize a large transient voltage suppression (TVS) diode to clip the voltage by absorbing the energy created by the voltage spike and convert the energy to heat, which in turn requires a heat sink. In addition, the high surge current (e.g., greater than 100 A) when utilizing the TVS diode hinders the inclusion of an inline fuse for fire and safety protection since the high surge current could potentially cause the fuse to blow.

In addition, existing systems may utilize a varistor that changes the resistance dynamically to regulate the output voltage. However, a heat sink is required to account for the heat generated when utilizing the varistor.

SUMMARY

The inventive system provides a switching mode front end surge protection circuit that protects downstream devices from a load dump. The switching mode front end surge protection circuit includes a metal-oxide-semiconductor field-effect transistor (MOSFET) that operates in either one of two modes based on a voltage provided by an alternator (hereinafter "alternator voltage") that is charging a vehicle battery. The MOSFET has an input voltage at the source pin of the MOSFET that is equal to the alternator voltage and also has an output voltage at the drain pin of the MOSFET. The MOSFET operates in a pass-through mode when the input voltage is less than a voltage threshold value. In addition, the MOSFET operates in a switching mode when the input voltage is greater than the voltage threshold value.

More specifically and when the alternator is charging the battery under normal conditions, the alternator provides an alternator voltage of, for example, approximately 13.8V to 14.8V. Under these normal conditions, the input voltage and thus the output voltage are less than the voltage threshold value and the MOSFET is in an on state and operates in a pass-through mode. In the pass-through mode, current flows from the alternator to the battery and/or the other downstream devices, e.g., electronic control units (ECUs), sensors, entertainment systems, etc., via a vehicle power bus.

When the battery is being charged by the alternator and a condition occurs (e.g., disconnection of battery, battery failure, blown power fuse, etc.), the alternator voltage surges (voltage spike), e.g., 100V. When the condition occurs causing the voltage spike, the input voltage and thus the output voltage are greater than the voltage threshold value and a control circuit, of the switching mode front end surge protection circuit, transitions the MOSFET to an off state.

When the MOSFET is in the off state during the voltage spike, an inductor ensures uninterrupted current is provided to the battery and/or downstream devices via the vehicle power bus. In addition, the output voltage decreases and drops below the voltage threshold value and the MOSFET is turned back on by the control circuit to allow the alternator to again provide current to the battery and/or other downstream devices via is the vehicle power bus. As such, the MOSFET transitions (i.e., oscillates) between the on state and off state, thus operating in the switching mode, during the voltage spike to protect the downstream devices from the voltage spike.

BRIEF DESCRIPTION OF THE DRAWINGS

The description below refers to the accompanying drawings, of which.

DETAILED DESCRIPTION OF AN ILLUSTRATIVE EMBODIMENT

Figure 1:
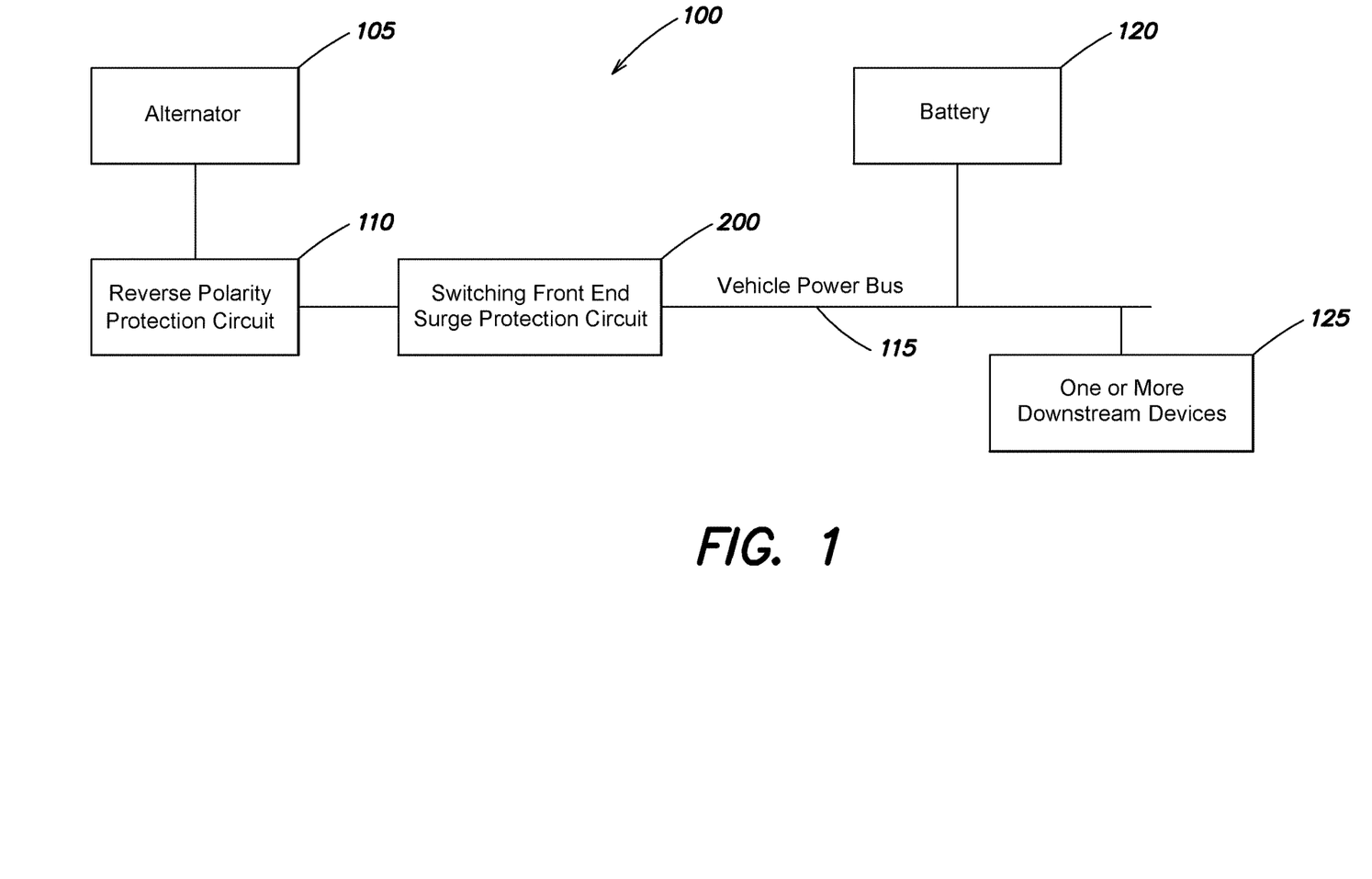
FIG. 1 depicts a system in accordance with an illustrative embodiment of the invention.

Referring to FIG. 1, a system 100 includes an alternator 105, a reverse polarity protection circuit 110, a switching mode front end surge protection circuit 200, a vehicle power bus 115, a vehicle battery 120, and one or more downstream devices 125. The vehicle battery 120 is charged by the alternator 105 via the vehicle power bus 115. In addition, the alternator 105 provides current, via the vehicle power bus 115, to the one or is more downstream devices 125 that include, but are not limited to, Electronic Control Units (ECUs), sensors, and/or entertainment systems.

The reverse polarity protection circuit 110 is positioned between the alternator 105 and the switching mode front end surge protection circuit 200 to protect against short-circuits that may lead to damage of the downstream devices 125, as is known by those skilled in the art.

Figure 2A:
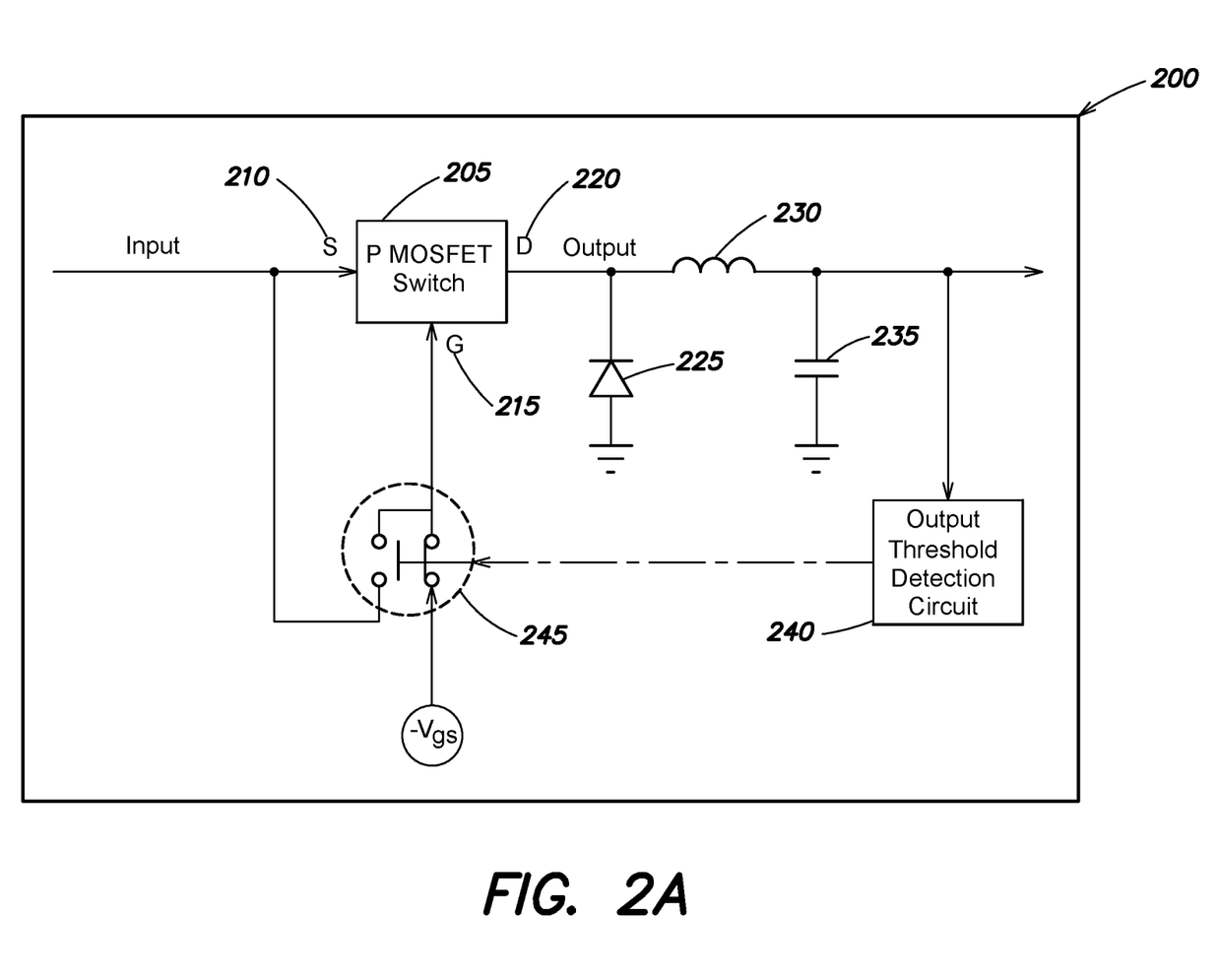
FIGS. 2A and 2B are a high-level block diagram of the switching mode front end surge protection circuit in accordance with an illustrative embodiment of the invention.
Figure 2B:
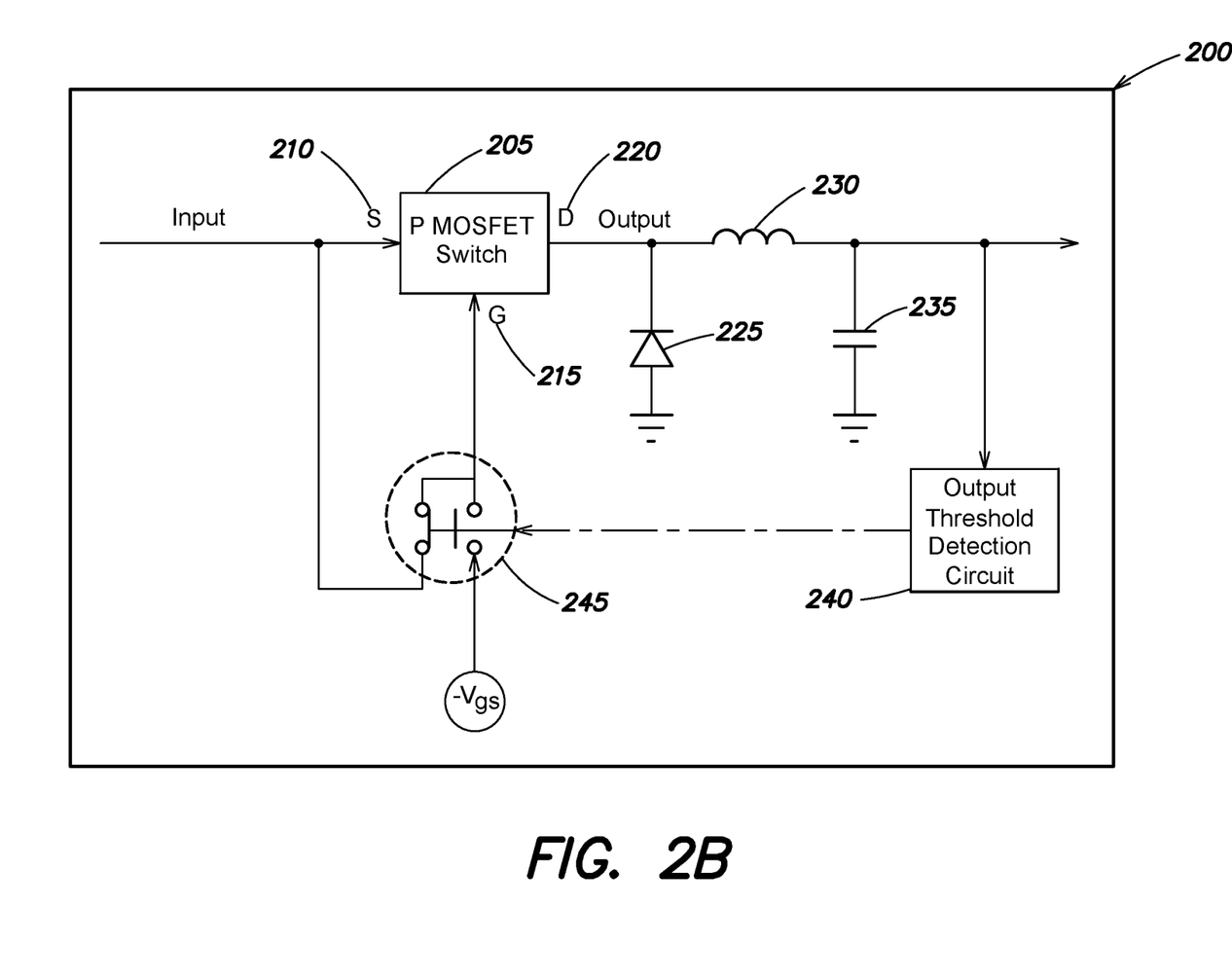

FIGS. 2A and 2B are high-level block diagrams of the switching mode front end surge protection circuit 200 in accordance with an illustrative embodiment of the invention. The switching mode front end surge protection circuit 200 includes a metal-oxide-semiconductor field-effect transistor (MOSFET) 205, such as a P-Channel MOSFET, having a source pin 210, a gate pin 215, and a drain pin 220. In addition, the switching mode front end surge protection circuit 200 includes a diode 225, an inductor 230, a capacitor 235, an output threshold detection circuit 240, and an optical on/off switch 245.

When the alternator 105 is operating under normal conditions, e.g., without a voltage spike and providing a normal alternator voltage of approximately 13.8V to 14.8V, the input voltage at the source pin (i.e., at the source side) and the output voltage at the drain pin (i.e., at the drain side) are less than a voltage threshold value. When the input voltage and thus the output voltage are less than the voltage threshold value, the output threshold detection circuit 240 configures the optical on/off switch circuit 245 such that the gate pin 215 of the MOSFET 205 is pulled to ground. With the gate pin 215 pulled down to ground, the gate-source potential is negative (represented by –Vgs) and is the MOSFET 205 is in the on state and operates in a pass-through mode as depicted in FIG. 2A.

In the pass-through mode, current flows from the alternator 105 through the polarity protection circuit 110 and the switching mode front end protection circuit 200 to the battery 120 and/or other downstream devices 125 via the vehicle power bus 115. In addition, the inductor 230 stores energy as current flows from the alternator to the battery 120 and/or downstream devices 125 via the vehicle power bus 115.

When a condition occurs (e.g., disconnection of the battery, failure of the battery, blown power fuse, etc.) the alternator voltage surges, which in in turn causes the input voltage and thus the output voltage to become greater than the voltage threshold value. When the input voltage and thus the output voltage are greater than the voltage threshold value, a signal from the output threshold detection circuit 240 configures the optical on/off switch 245 to transition, such that the gate pin 215 is coupled to the source side of the MOSFET as depicted in FIG. 2B. With the gate pin 215 connected to the source side of the MOSFET, the gate-source potential is effectively zero (i.e., the voltages at the source pin and gate pin are effectively the same) and the MOSFET 205 is transitioned to the off state.

When the MOSFET 205 is in the off state during the voltage spike, the diode 225, inductor 230, and capacitor 235 together ensure uninterrupted current is provided to the battery and/or downstream devices via the power bus 115. In addition, the output voltage decreases and drops below the voltage threshold value. After the output voltage drops below the voltage threshold value during the voltage spike, the output threshold detection circuit 240 transitions the optical on/off switch 245 to pull the gate pin 215 back to is ground to transition the MOSFET 205 back to the on state as depicted in FIG. 2A. Therefore, the MOSFET 205 oscillates between the on state and off state, as depicted in FIGS. 2A and 2B, thus operating in the switching mode during the voltage spike to protect the downstream devices 125 from the voltage spike. Although FIGS. 2A and 2B are high level block diagrams that include particular components, it is expressly contemplated that FIGS. 2A and 2B may include other components and circuitry that are not shown.

Figure 3:
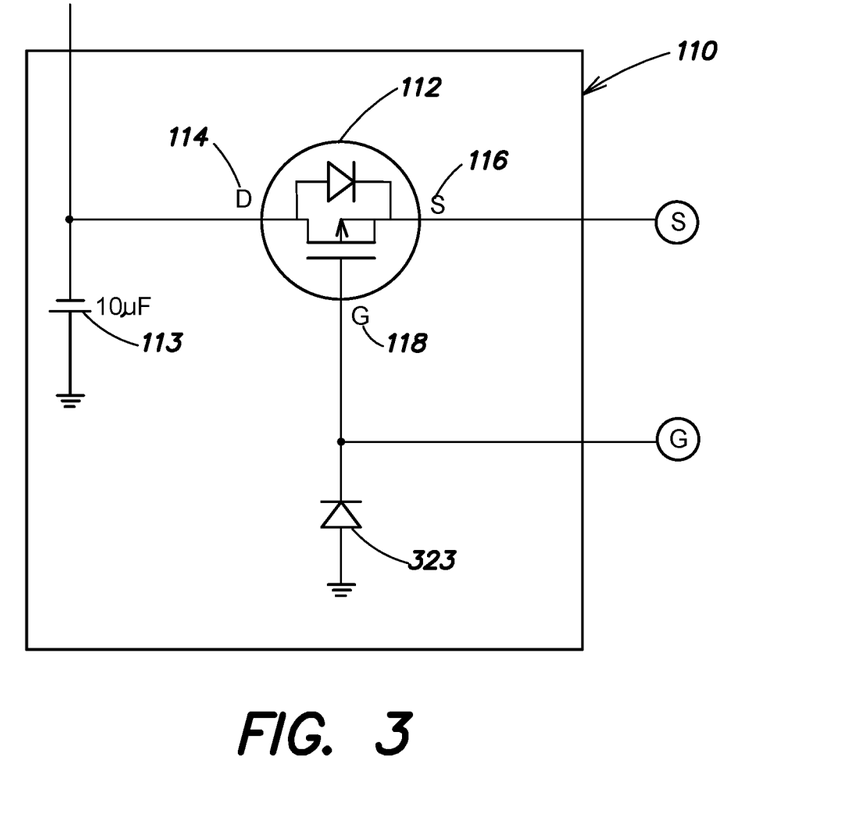
FIG. 3 is a detailed block diagram of a reverse polarity protection circuit that may be used with the switching mode front end surge protection circuit in accordance with an illustrative embodiment of the invention.

FIG. 3 is a detailed block diagram of a reverse polarity protection circuit 110 that may be used with the switching mode front end surge protection circuit 200 in accordance with an illustrative embodiment of the invention. The reverse polarity protection circuit 110 protects against short-circuits that may lead to damage of the downstream devices 125, as known by those skilled in the art. Specifically, the drain pin 114 of the MOSFET 112 of the reverse polarity protection circuity 110 is coupled to the alternator 105. In addition, the source pin 116 and the gate pin 118 of the MOSFET 112 are coupled to the switching front end surge protection circuit 200 as depicted in FIG. 4.

Figure 4:
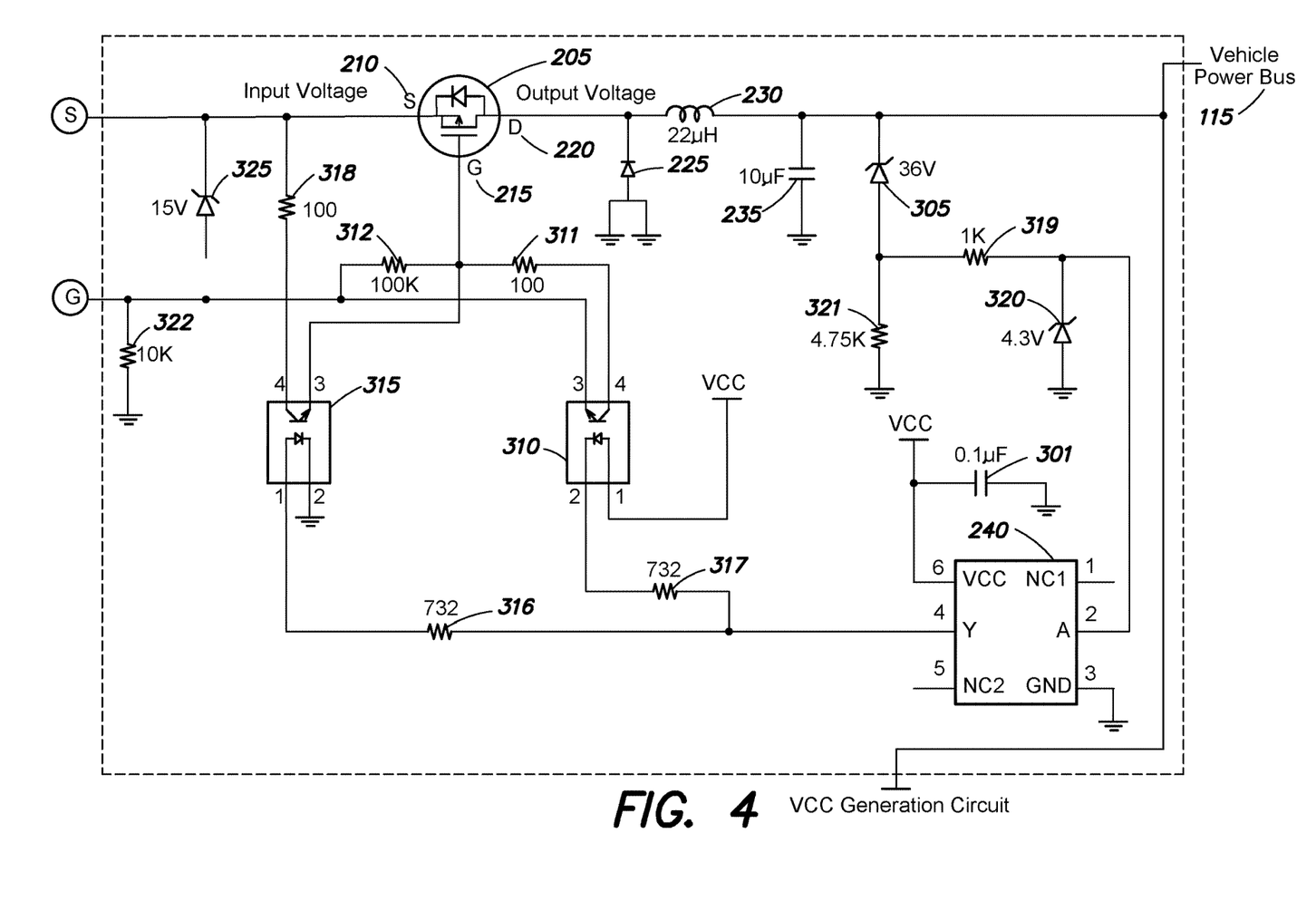
FIG. 4 is a detailed block diagram of a switching mode front end surge protection circuit in accordance with an illustrative embodiment of the invention.

FIG. 4 is a detailed block diagram of the switching mode front end surge protection circuit 200 in accordance with an illustrative embodiment of the invention. VCC refers to voltage (e.g., 5V) from a power source. For example, VCC may be supplied from the vehicle power bus 115 when, for example, the voltage across the vehicle power bus 115 is less than 10V. Alternatively, VCC may be supplied by a VCC generation circuit. In addition, as known by those skilled in the art, capacitors 301 and 113 are utilized to keep the voltage constant.

With correct polarity, e.g., when the positive and negative terminals of the vehicle battery 120 are correctly connected, the gate-source potential of the MOSFET 112 in FIG. 3 and the MOSFET 205 in FIG. 4 are negative, and the MOSFETs 112 and 205 are in the on state. With reverse polarity, the gate-source potential of the MOSFET 112 and the MOSFET 205 are positive, and the MOSFETs 112 and 205 are in the off state to prevent short-circuits that may lead to damage of the downstream devices 125. It is noted that with reverse polarity, the forward voltage drop of Zener diode 325, as depicted in FIG. 4, ensures that the gate-source potential of the MOSFETs 112 and 205 is clamped at approximately 0.7V. It is further noted that diode 323 in FIG. 3 is utilized to turn off MOSFET 112 in an efficient manner with reverse polarity, as known by those skilled in the art.

When the alternator 105 is operating under normal conditions, e.g., without a voltage spike, the alternator 105 provides a normal alternator voltage, e.g., 13.8V. Therefore, the input voltage at the source pin 210 is 13.8V and thus the output voltage at the drain 220 is also 13.8V. The voltage threshold value is the Zener voltage of Zener diode 305, which in this example is 36V, plus the load voltage threshold value required to transition the output threshold detection circuit 240 from "low" to "high," which in this example is 2V. Therefore, the voltage threshold value in this example is 38V.

As such, the input voltage and thus the output voltage of 13.8V are less than the voltage threshold value of 38V and current is not allowed to flow in the reverse direction of Zener diode 305 to the output threshold detection circuit 240. Therefore, pin 2 (A) of the output threshold detection circuit 240 is "low," and thus pin 4 (Y) is also "low." When pin 4 (Y) is "low," photocoupler 310 is on and photocoupler 315 is off, wherein the photocoupler 310 and 315 make up the optical on/off switch circuit 245 as depicted in FIGS. 2A and 2B. As such, current flows through photocoupler 310 and the gate pin 215 is of the MOSFET 205 is pulled to ground through resistors 311, 312, and 322. Therefore, the voltage at the source pin is 13.8V and the voltage at the gate pin is effectively 0V. Therefore and under normal conditions, the gate-source potential is negative and, specifically, –13.8V. Since the gate-source potential is negative, the MOSFET 205 is in the on state and operates in the pass-through mode.

In the pass-through mode, current flows from the alternator 105 through the polarity protection circuit 110 and the front end surge protection circuit 200 to the battery 120 and/or other downstream devices 125 via the vehicle power bus 115. In addition, the inductor 230 stores energy as current flows from the alternator 105 through the switching front end surge protection circuit 200 to the battery 120 and/or downstream devices 125 via the vehicle power bus 115.

It is noted that at startup and when the switching mode front end surge protection circuit 200 is first powered on, the photocoupler 310 turns on the MOSFET with minimal delay since the gate pin 215 of the MOSFET is pulled to ground by the photocoupler 310, as described above. This has the advantage of turning on the MOSFET 205 "faster" than the MOSFET would be turned on if the switching mode front end surge protection circuit 200 did not include the photocoupler 310.

When a voltage spike is experienced, the alternator voltage may be, for example, 100V. Therefore, the input voltage and thus the output voltage are 100V. As such, the input voltage and thus the output voltage are above the voltage threshold value of 38V as depicted in FIG. 4. Therefore, current flows in the reverse direction of Zener diode 305. Specifically, current flows through resistor 321 to ground. In addition, current flows through resistor 319 to the output threshold detection circuit 240 thus causing pin 2 (A) to is switch to "high," which in turn causes pin 4 (Y) to switch to "high." It is noted that Zener diode 320 is utilized to clamp the voltage across the output threshold detection circuit 240. As such, the voltage across the output threshold detection circuit 240 does not exceed 4.3V.

When pin 4 (Y) is "high," current flows through resistor 317 to photocoupler 310 to turn photocoupler 310 off. In addition, current flows through resistor 316 to photocoupler 315 to turn photocoupler 315 on. When photocoupler 315 is on, current flows through resistor 318 and photocoupler 315 to the gate pin 215. As such, the voltage at the gate pin 215 and the voltage at the source pin 210 are effectively the same (e.g., 100V). Therefore, the gate-source potential is effectively zero and the MOSFET 205 is transitioned to the off state. It is noted that the resistor 312 ensures that the gate-source potential of MOSFET 112 in FIG. 3 is maintained at −15V such that MOSFET 112 remains in the on state while the MOSFET 205 is in the off state during the voltage spike. When the MOSFET 205 is in the off state during the voltage spike, the diode 225, inductor 230, and capacitor 235 together ensure that uninterrupted current is provided to the battery and/or downstream devices via the vehicle power bus 115. In addition and during the voltage spike, the input voltage is still 100V and the output voltage decreases and drops below the voltage threshold value, e.g., 38V. When the output voltage drops below the voltage threshold value of 38V, current is no longer allowed to flow in the reverse direction of Zener diode 305. As such, pin 2 (A) of the output threshold detection circuit 240 switches back to "low," and thus pin 4 (Y) is also switched back to "low." When pin 4 (Y) is "low," photocoupler 310 is on and photocoupler 315 is off. As such, current flows through photocoupler 310 and the gate pin 215 of the MOSFET 205 is is pulled to ground through resistors 311, 312, and 322. Therefore, the gate-source potential is again negative, and the MOSFET 205 is transitioned to the on state. As such, the MOSFET 205 oscillates between the on state and the off state as described above, such that the MOSFET 205 operates in the switching mode during the voltage spike to protect the downstream devices 125 from the voltage spike.

It is noted that Zener diode 305 is utilized to clamp the voltage across the vehicle power bus 115. As such, the voltage across the vehicle power bus 115 does not exceed 36V even when the MOSFET 205 is on during the voltage spike. In addition, Zener diode 325 has a Zener voltage of 15V to clamp the gate-source potential to −15V when the MOSFETs 205 and 112 are in the on state during the voltage spike. Specifically, consider the example above where the voltage spike of 100V causes the input voltage and thus the output voltage to be 100V. Before the MOSFET 205 is transitioned to the off state as described above, the voltage at the source pin of the MOSFETs 205 and 112 is 100V and the voltage at the gate pin of the MOSFETs 205 and 112 is 85V (100V−15V) due to Zener diode 325. Without Zener diode 325, the gate-source potential would be −100V, which could potentially damage the MOSFETs 205 and 112.

The foregoing description described certain example embodiments. It will be apparent, however, that other variations and modifications may be made to the described embodiments, with the attainment of some or all of their advantages. For example, although FIG. 4 includes various components (e.g., resistors, capacitors, inductors, Zener diodes) with different values, it is expressly contemplated that the circuit in FIG. 4 may include components with other values. For example, diode 305 may have a Zener voltage of 25V or some other voltage. Accordingly, the foregoing description is to be taken only by way of example, and not to otherwise limit the scope of the disclosure. It is the object of the appended claims to cover all such variations and modifications as come within the true spirit and scope of the disclosure.

The invention claimed is:

1. A surge protection circuit comprising:
   a metal-oxide-semiconductor field-effect transistor (MOSFET) coupled to a power bus, wherein the MOSFET includes at least a source pin and a drain pin, the MOSFET configured to:
   operate in a pass-through mode and provide current to the power bus while an input voltage at the source pin and an output voltage at the drain pin are less than a voltage threshold value, and
   operate in a switching mode and oscillating between an on state and an off state during a time when the input voltage at the source pin is greater than the voltage threshold value and the output voltage at the drain pin oscillates between being less than and greater than the voltage threshold value.

2. The surge protection circuit of claim 1, wherein an alternator provides the current and charges a vehicle battery via the power bus.

3. The surge protection circuit of claim 1, wherein the input voltage at the source pin is greater than the voltage threshold value when a condition occurs, wherein the condition includes at least one of a vehicle battery disconnecting from the power bus, a failure of the vehicle battery, or a blown power fuse.

4. The surge protection circuit of claim 1, wherein one or more downstream devices are coupled to the power bus and include one or more of an electronic control unit, sensors, or an entertainment system.

5. The surge protection circuit of claim 1, further comprising:
   a detection circuit configured to produce a first output value when the output voltage at the drain pin is less than the voltage threshold value, and the detection circuit is further configured to produce a second output value when the output voltage at the drain pin is greater than the voltage threshold value.

6. The surge protection circuit of claim 5, further comprising:
   a Zener diode positioned between the drain pin of the MOSFET and the detection circuit, wherein the Zener diode has a Zener voltage and the voltage threshold value is based on the Zener voltage.

7. The surge protection circuit of claim 5, further comprising:
   a first switch coupled to a gate pin of the MOSFET and the detection circuit, the first switch configured to, when the detection circuit produces the first output value, turn on causing a gate-source potential of the MOSFET to be negative, wherein the MOSFET is in the on state when the gate-source potential is negative; and a second switch coupled to the gate pin of the MOSFET and the detection circuit, the second switch configured to, when the detection circuit produces the first output value, turn off.

8. The surge protection circuit of claim 7, further comprising:

the first switch further configured to, when the detection circuit produces the second output value, turn off; and the second switch further configured to, when the detection circuit produces the second output value, turn on causing the gate-source potential of the MOSFET to be substantially zero, wherein the MOSFET is in the off state when the gate-source potential is substantially zero.

9. The surge protection circuit of claim 1, wherein the surge protection circuit is connected to an alternator through a polarity protection circuit.

10. A surge protection circuit comprising:

a metal-oxide-semiconductor field-effect transistor (MOSFET) coupled to a power bus, the MOSFET having a source pin with an input voltage, a gate pin, and a drain pin with an output voltage, the MOSFET configured to:

operate in a pass-through mode to provide current to the power bus when the input voltage at the source pin is less than a voltage threshold value and the output voltage at the drain pin is less than the voltage threshold value, and operate in a switching mode and oscillate between an on state and an off state during a time when the input voltage at the source pin is greater than the voltage threshold value and the output voltage at the drain pin oscillates between being less than and greater than the voltage threshold value, wherein the MOSFET is in the on state while operating in switching mode when the output voltage at the drain pin is less than the voltage threshold value and the MOSFET is in the off state while operating in switching mode when the output voltage at the drain pin is greater than the voltage threshold value.

11. The surge protection circuit of claim 10, wherein an alternator charges a vehicle battery via the power bus.

12. The surge protection circuit of claim 10, wherein the input voltage is greater than the voltage threshold value when a condition occurs that includes at least one of a vehicle battery disconnecting from the power bus, a failure of the vehicle battery, or a blown power fuse.

13. The surge protection circuit of claim 10, wherein one or more downstream devices are coupled to the power bus and include one or more of an electronic control unit, sensors, or an entertainment system.

14. The surge protection circuit of claim 10, further comprising:

a detection circuit configured to produce a first output value when the output voltage is less than the voltage threshold value, and the detection circuit is further configured to produce a second output value when the output voltage is greater than the voltage threshold value.

15. The surge protection circuit of claim 14, further comprising:

a Zener diode positioned between the drain pin of the MOSFET and the detection circuit, wherein the Zener diode has a Zener voltage and the voltage threshold value is based on the Zener voltage.

16. The surge protection circuit of claim 14, further comprising:

a first switch coupled to the gate pin and the detection circuit, the first switch configured to, when the detection circuit produces the first output value, turn on causing a gate-source potential of the MOSFET to be negative, wherein the MOSFET is in the on state when the gate-source potential is negative; and a second switch coupled to the gate pin and the detection circuit, the second switch configured to, when the detection circuit produces the first output value, turn off.

17. The surge protection circuit of claim 16, further comprising:

the first switch further configured to, when the detection circuit produces the second output value, turn off; and the second switch further configured to, when the detection circuit produces the second output value, turn on causing the gate-source potential of the MOSFET to be substantially zero, wherein the MOSFET is in the off state when the gate-source potential is substantially zero.

18. The surge protection circuit of claim 10, wherein the surge protection circuit is connected to an alternator through a polarity protection circuit.

19. A surge protection circuit comprising:

a metal-oxide-semiconductor field-effect transistor (MOSFET) coupled to a power bus, the MOSFET having at least a source pin and a drain pin, the MOSFET configured to:

operate in a switching mode and oscillating between an on state and an off state during a time when an input voltage at the source pin is greater than a voltage threshold value and the output voltage at the drain pin oscillates between being less than and greater than the voltage threshold value, wherein the MOSFET is in the on state while operating in switching mode when an output voltage at the drain pin is less than the voltage threshold value and the MOSFET is in the off state while operating in switching mode when the output voltage at the drain pin is greater than the voltage threshold value.

20. The surge protection circuit of claim 19, wherein the surge protection circuit is connected to an alternator through a polarity protection circuit.

* * * * *